United States Patent [19]
Baldwin

[11] Patent Number: 5,233,171
[45] Date of Patent: Aug. 3, 1993

[54] OPTICAL READER WITH POWER ISOLATION

[75] Inventor: Dwight G. Baldwin, Austin, Tex.

[73] Assignee: Minnesota Mining and Manufacturing Company, St. Paul, Minn.

[21] Appl. No.: 582,430

[22] Filed: Sep. 13, 1990

[51] Int. Cl.⁵ .......................... G06K 7/10; H02P 1/00
[52] U.S. Cl. ................................. 235/467; 235/470; 318/139
[58] Field of Search .............. 318/139, 254, 138, 150; 359/599, 896; 235/468, 470, 472, 462, 483, 485, 467; 388/816

[56] References Cited

U.S. PATENT DOCUMENTS

| | | | |
|---|---|---|---|
| 3,211,470 | 10/1965 | Wilson | 283/18 |
| 3,225,177 | 12/1965 | Sites et al. | 235/61.11 |
| 3,541,310 | 11/1970 | Sites | 235/61.11 |
| 3,562,494 | 2/1971 | Schmidt | 235/61.11 |
| 3,569,676 | 3/1971 | Sites et al. | 235/61.12 |
| 3,663,803 | 5/1972 | Mohan et al. | 235/92 |
| 3,783,273 | 1/1974 | Strohschneider | 250/223 |
| 3,946,203 | 3/1976 | Hecht et al. | 235/468 |
| 3,992,623 | 11/1976 | Rhyins et al. | 250/216 |
| 4,085,314 | 4/1978 | Schultz et al. | 235/487 |
| 4,160,902 | 7/1979 | Wijngaarden | 250/461 |
| 4,237,375 | 12/1980 | Granholm | 235/487 |
| 4,283,622 | 8/1981 | Passer et al. | 235/462 |
| 4,420,261 | 12/1983 | Barlow et al. | 356/375 |
| 4,491,923 | 1/1985 | Look | 364/478 |
| 4,500,116 | 2/1985 | Ferro et al. | 235/491 |
| 4,544,836 | 10/1985 | Galvin et al. | 235/487 |
| 4,554,836 | 10/1985 | Galvin et al. | 235/487 |
| 4,603,262 | 7/1986 | Eastman et al. | 235/472 |
| 4,605,846 | 8/1986 | Duret et al. | 235/468 |
| 4,612,494 | 9/1986 | Kawamura | 318/150 |
| 4,658,147 | 4/1987 | Eldering | 235/462 |
| 4,685,147 | 8/1987 | Honjo | 235/462 |
| 4,753,498 | 6/1988 | Saitoh et al. | 350/6.8 |
| 4,766,298 | 8/1988 | Meyers | 235/470 |
| 4,782,219 | 11/1988 | Crater | 235/462 |
| 4,789,775 | 12/1988 | McClain et al. | 235/470 |
| 4,795,224 | 1/1989 | Goto | 350/6.3 |
| 4,905,300 | 2/1990 | Bhagwat et al. | 388/816 |
| 5,079,412 | 1/1992 | Sugiyama | 235/472 |
| 5,140,142 | 8/1992 | Atsushi | 235/462 |

OTHER PUBLICATIONS

H. P. Louis and H. G. Seifert, "Copier Diffusor", *IBM Technical Disclosure Bulletin*, vol. 23, No. 12, May 1981, p. 5419.

3M Product Bulletin, "Scotchlite Reflective Film", Jun. 1985 G. Marshall, "Laser Beam Scanning", 1985, Chpater 1.

Society of Photo-Optical Instrumentation Engineers, "The Use of Electro-Mechanical Mirror Scanning Devices", Aug. 1976.

Society of Photo-Optical Instrumentation Engineers, "Optics for Laser Scanning" Mar./Apr. 1976.

*Primary Examiner*—Eugene R. LaRoche
*Assistant Examiner*—Christopher R. Glembocki
*Attorney, Agent, or Firm*—Gary L. Griswold; Walter N. Kirn; Jack V. Musgrove

[57] ABSTRACT

A optical reader for scanning optical marks from a substrate. The reader employs a novel optical geometry to eliminate undesirable specular reflections from entering the optical detection system. A stage area is provided for receiving the substrate, the stage having a window through which an incident beam of light passes at an oblique angle with respect to the window. A retrocollection system is used to return reflections from the substrate to the optical assembly. By directing the beam at an oblique angle with respect to the window, specular reflections are not collected in the retrocollection system and thus are not received by the optical detection system. The invention also utilizes a permanent magnet, direct current motor for controlling a scanning mirror, and further has a motor control circuit for preventing the introduction of electrical noise from the motor during the scan. A sensor may be provided to detect the presence of the card on the stage and provide "on demand" scanning.

15 Claims, 4 Drawing Sheets

OPTICAL READER WITH POWER ISOLATION

BACKGROUND OF THE INVENTION

1. Field of the Invention

The present invention generally relates to optical scanners or readers, and more particularly to a device for reading retroreflective bar codes from a substrate such as a card.

2. Description of the Prior Art

Optical readers are used today in a wide variety of applications, such as optical character recognition, electronic facsimile transmission, and bar code scanning of Universal Product Codes which have been adopted by the retail industry. In order to understand the basic principles of optical scanning, it is necessary to distinguish between three types of reflections, namely, specular reflection, diffuse reflection, and retroreflection.

A familiar example of specular reflection is the image observed in a mirror or other highly polished surface. A beam of light striking such a surface narrowly reflects off the surface at an angle which is equal to the angle of incidence of the light beam. Diffuse reflection, in contrast, occurs when light strikes a dull or matte (Lambertian) surface, and distributes the light in all directions. Technically, diffuse reflection is actually a form of specular reflection in which the reflective material contains, on a microscopic level, a plurality of discrete surfaces having different orientations. This blurs the distinction between specular and diffuse components and, often, there is no true specular reflection, but rather a high-intensity lobe with a definite spread. For practical purposes, however, and for the purposes of discussion here, specular reflection is quite different from diffuse reflection, and most real surfaces exhibit both specular and diffuse reflection.

The third kind of reflection, retroreflection, occurs when incident light is narrowly reflected back along the incident beam path. This well-known phenomenon is usually achieved by the use of hemispherically-coated transparent microspheres embedded in a substrate; an example of such material is Scotchlite brand retroreflective sheeting, sold by Minnesota Mining & Manufacturing Company (3M), assignee of the present invention ("Scotchlite" is a trademark of 3M). See also U.S. Pat. No. 4,085,314 issued to Schultz et al. on Apr. 18, 1978.

Most optical scanners used today (including the laser scanners commonly seen in grocery stores) rely on diffuse reflection to read the coded markings. Specular reflections are too angle-dependent to be utilized in a practical manner. Retroflection, however, may advantageously be used in conjunction with scanning of optical marks, as exemplified in U.S. Pat. Nos. 3,225,177 (issued to Stites et al. on Dec. 21, 1965); 3,541,310 (issued to F. Stites on Apr. 17, 1970); and 3,569,676 (issued to Stites et al. on Mar. 9, 1971). Retroreflective coding can be scanned more rapidly and reliably, and may be read at greater distances, with a lower intensity light source, or with a less sensitive detector.

Unfortunately, no object exhibits perfect diffuse reflection, so some amount of specular reflection is unavoidable. These reflections often prove quite troublesome in scanning applications. For example, even a black mark can yield a specular reflection if the material forming the mark is sufficiently glossy, and such a reflection may actually be brighter than the diffuse reflection emanating from an adjacent white mark or the substrate. Specular reflections even affect retroreflective coding since they saturate the optical detector and diminish the effective contrast between the retroreflective mark and the plain substrate. This disadvantage is present in both "flying-spot" and "flying-aperture" type scanners. The only prior art method used to compensate for this effect is to flood the mark with light and limit the collection angle, but this requires a much more intense light source and a complicated baffle system. It would, therefore, be desirable and advantageous to devise an improved optical reader which minimizes the adverse impact of specular reflections.

SUMMARY OF THE INVENTION

The foregoing improvement is achieved in an optical reader comprising means for illuminating the surface to be scanned, and optical collection means oriented with respect to the illumination means whereby specular reflections from the scanned surface are not received by the detection means. The detector may sense diffuse reflections or retroreflections. In the preferred embodiment, a beam splitter is used to divert the return signal, traveling along substantially the same path as the incident beam, toward the optical detector. The device is most advantageously used in reading retroreflective marks.

A specific embodiment is designed to read bar codes from a card or other essentially flat substrate. This embodiment includes a stage area and a compact folded optical assembly constructed so that the incident light beam will strike the stage area at an oblique angle. Further means may be provided to insure that the surface of the card, as it is placed in the reader, is never oriented orthogonal to the incident light beam. A unique motor control circuit and alternating-clock bar code are also disclosed.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PRESENTLY PREFERRED EMBODIMENT

Figure 1:
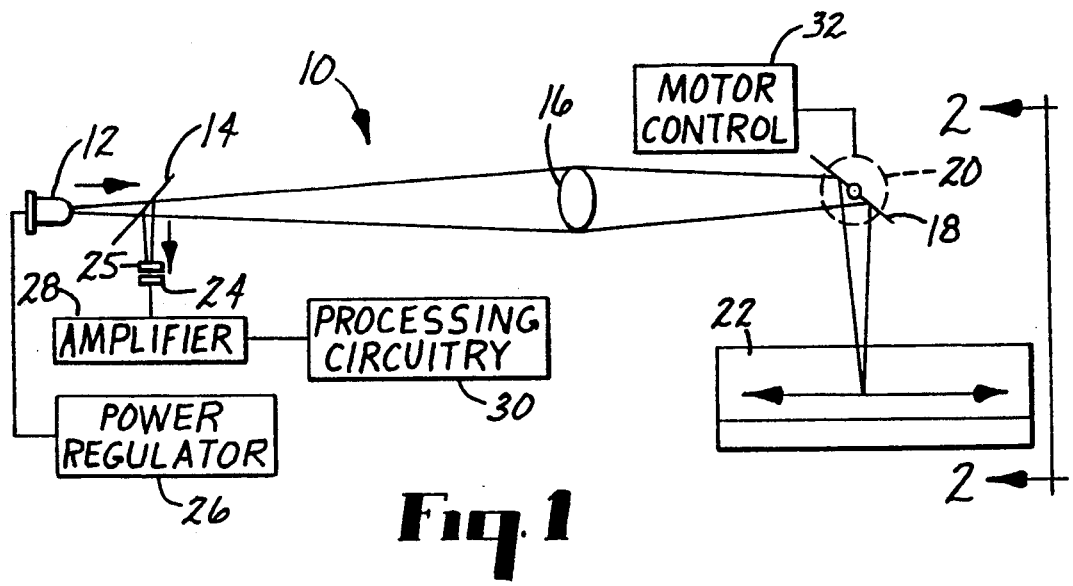
FIG. 1 is a schematic diagram of a generalized optical assembly of the present invention, depicting in block form the supporting electrical systems.

With reference now to the figures, and in particular with reference to FIG. 1, a generalized embodiment of the optical reader 10 of the present invention is depicted. Optical reader 10 includes an optical subsystem comprising a light source 12, a beam splitter 14, a focussing lens 16, a scanning mirror 18 coupled to a motor 20, a stage area 22 for receiving a reflective object, and an optical detector 24. Optical reader 10 also includes an electrical subsystem comprising a power regulator 26 for light source 12, an amplifier 28, and processing circuitry 30 connected to amplifier 28 for analyzing the received signals. The electrical subsystem further includes a control circuit 32 for motor 20.

In the generalized embodiment of optical reader 10, light source 12, which may be, e.g., a laser, laser diode or light emitting diode (LED), emits light which passes through beam splitter 14, typically a partially silvered mirror. The light is collected and focussed by lens 16 and is reflected off scanning mirror 18 onto stage area 22. The distances between light source 12, lens 16, and stage area 22 are selected to cooperate with the focal length of lens 16, whereby the beam is focussed down to a narrow spot when it reaches the receptive surface of stage area 22. The minimum optical path for a given lens is obtained by placing the light source at a distance of twice the focal length from the lens; however, in order to obtain the desired spot size, light source 12 should moved even farther from lens 16.

As indicated by the two-headed arrow shown on stage area 22, the incident light beam is scanned across stage area 22 by causing mirror 18 to rotate in an oscillating fashion, via motor control 32. Reflections from an object placed on stage area 22, which are directed back toward mirror 18, return along substantially the same path as the incident light beam, through lens 16, and are then reflected by beam splitter 14 toward optical detector 24. A filter 25 may optionally be used to filter out ambient light. The return signal is then augmented by amplifier 28, and processed by circuitry 30 according to the nature of the object being scanned, e.g., optically scannable typeface or bar coding.

The use of the same optical components to direct the return signal along substantially the same path as the incident beam is conventionally known as retrocollection and, while this collection technique is generally preferable, it is not critical to the functioning of optical reader 10. In other words, the invention described herein could be designed to provide a separate path for the return signal heading to optical detector 24, so the foregoing description in this regard should not be construed in a limiting sense.

Figure 2:
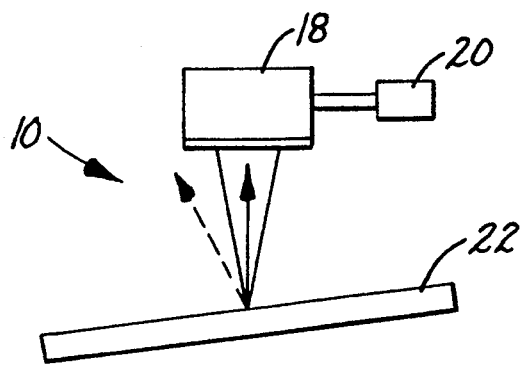
FIG. 2 is a side elevational view of the generalized optical assembly as seen along lines 2—2 of FIG. 1.

One novel aspect of the present invention is the manner in which the optical system is oriented with respect to stage area 22. As shown in FIG. 1, stage area 22 is tilted downward slightly; this is further illustrated in the side elevational view of FIG. 2, to which attention in now directed. This configuration provides the advantage of deflecting specular reflections (indicated by the dashed arrow) away from mirror 18, meaning that such reflections will never be seen by optical detector 24. Instead, only retroreflections or diffuse reflections (indicated by the solid arrow) are gathered by mirror 18 and lens 16. This overcomes the problems associated with interfering specular reflections as discussed above in the Description of the Prior Art.

Figure 3:
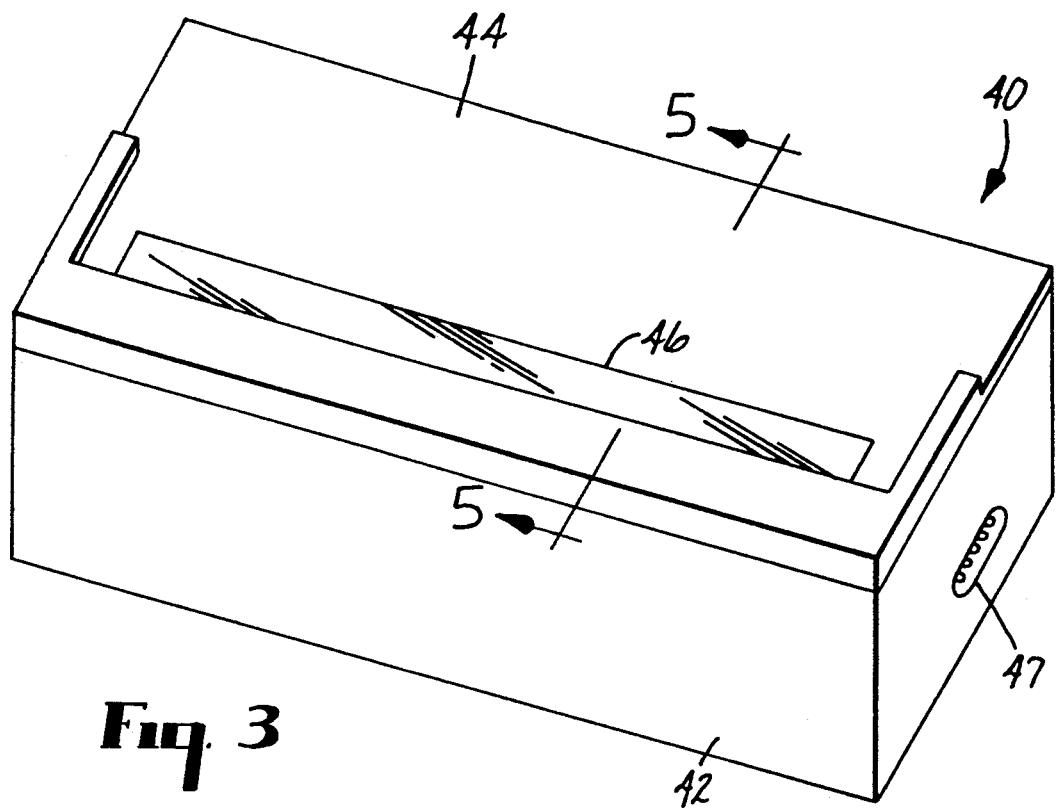
FIG. 3 is a perspective view of the card reader embodiment of the present invention.

The present invention is particularly suited for reading optical marks from a card or other essentially planar substrate. FIG. 3 illustrates such a card reader embodiment 40, which includes a housing 42 and a cover 44, the cover having a light-transmissive section 46 equivalent to the stage area 22; the light-transmissive section may simply be an opening or slot, but is preferably a window formed of transparent plastic, or another transparent medium such as glass. A connector port 47 may be provided to allow electrical connection to a separate unit which may house part of the electrical system of the present invention, or provide access to peripheral devices. The connection may alternatively be established by means of a wireless remote connection, i.e., radio wave communications.

Figure 4:
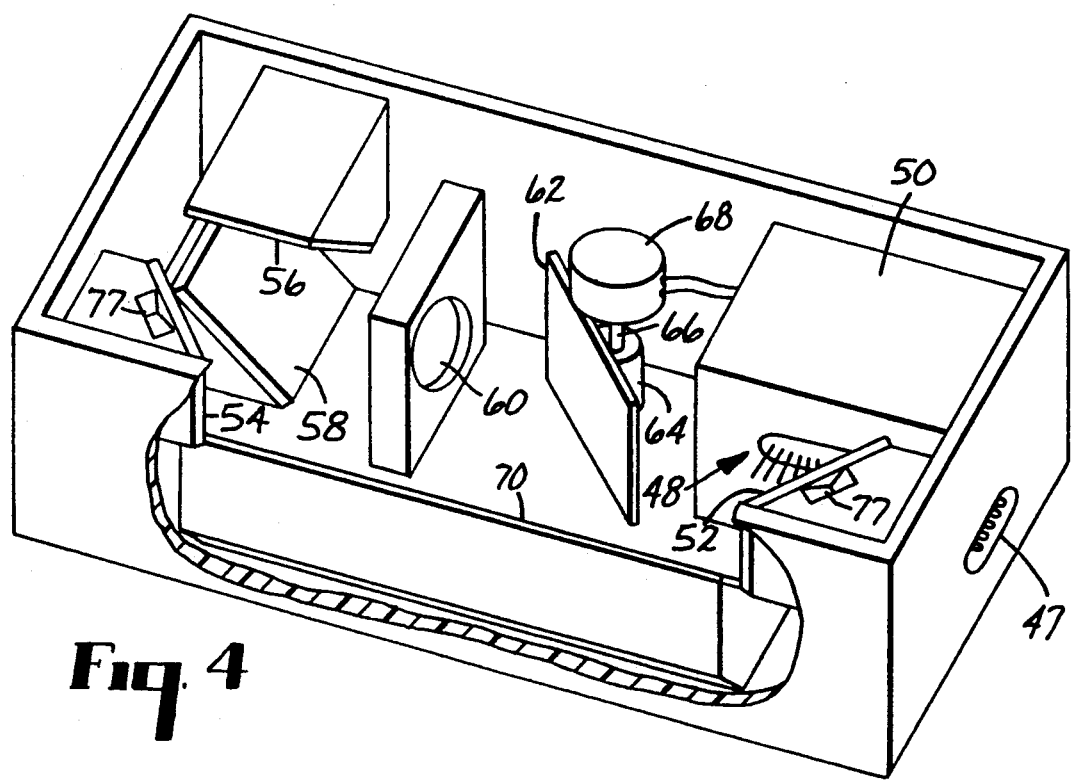
FIG. 4 is a perspective view similar to FIG. 3 but the cover of the card reader has been removed and the front wall is cut out to illustrate the internal optical assembly.

Referring now to FIG. 4, card reader 40 is shown with cover 44 removed so as to expose its internal optical configuration. This configuration is "folded," meaning that several mirrors are used to allow an effectively long optical path to exist within a relatively small volume. The optical path begins with a light source 48 housed in an optical assembly block 50. The specific characteristics of light source 48 are discussed below in conjunction with FIG. 7. A beam of light emanating from block 50 first strikes a mirror 52 which reflects the beam across the inside front of housing 42 to a symmetrically placed second mirror 54. Second mirror 54 reflects the beam toward the back of housing 42 to a third mirror 56, which in turn reflects the beam downward to a fourth mirror 58. The beam is then collected and focussed by a lens 60 and directed to a scanning mirror 62. As previously mentioned, the size of lens 60 should be selected so that the beam fully fills the lens; this is a function of the beam divergence of light source 48. Of course, a lens is not necessary if the light source is already collimated, e.g., a laser source. It is only necessary to provide a spot of light at the approximate location of the object being scanned.

Scanning mirror 62 is attached to a hub 64 which is connected to the shaft 66 of a motor 68. The motor may be secured to housing 42 by any mounting means, such as a bracket (not shown). Further details of motor 68 are also discussed below in conjunction with FIG. 7. Rotating mirrors, such as polygonal mirrors and galvanometric mirrors, have been used in prior art optical scanners. Polygonal scanning mirrors, however, are not spatially efficient since only a small portion of the cross-sectional area of a polygonal mirror is used during any one scan. This is in part a function of the amount of room that is needed to achieve full rotation of the mirror.

In contrast, scanning mirror 62 does not continuously rotate but rather oscillates, and it achieves a greater spatial efficiency in comparison to polygonal mirrors since the beam impinging on mirror 62 strikes a larger area with respect to the total cross-sectional area occupied by the mirror arrangement. This further enhances the compact nature of card reader 40. Also, the use of an oscillating mirror instead of a rotating polygonal mirror obviates problems associated with determination of the windage (rotational frequency) of a rotating mirror, which can adversely affect scanning performance. Scanning mirror 62 is thus closer to the prior art galvanometric mirrors but, as discussed below in connection with the description of motor 68, the scanning action of mirror 62 is achieved without the high expense of a galvanometric motor. Galvanometric motors also run continuously, and consume more power than the preferred form of motor 68.

When the incident light beam bounces off scanning mirror 62, it is directed toward an elongated mirror 70 which reflects the beam upward toward window 46 in cover 44. The focal length of lens 60 is chosen to focus the incident beam at or near window 46. As those skilled in the art will appreciate, the distance the incident beam must travel to the fringes of window 46 is longer than the distance to the center of window 46, so the beam cannot be perfectly focussed across the full length of window 46. The depth of field may be maximized by selecting a lens with a high f-number, or a "flat field" scanning lens may be used to focus the beam evenly across window 46, but this would require that the scanning mirror 62 be placed before the flat field lens arrangement. Instead, the depth of field of lens 60 may be used to focus the incident beam just inside window 46 at its extreme ends, but just outside window 46 at its center. In this manner, the beam is adequately focussed at any location along window 46.

Figure 5:
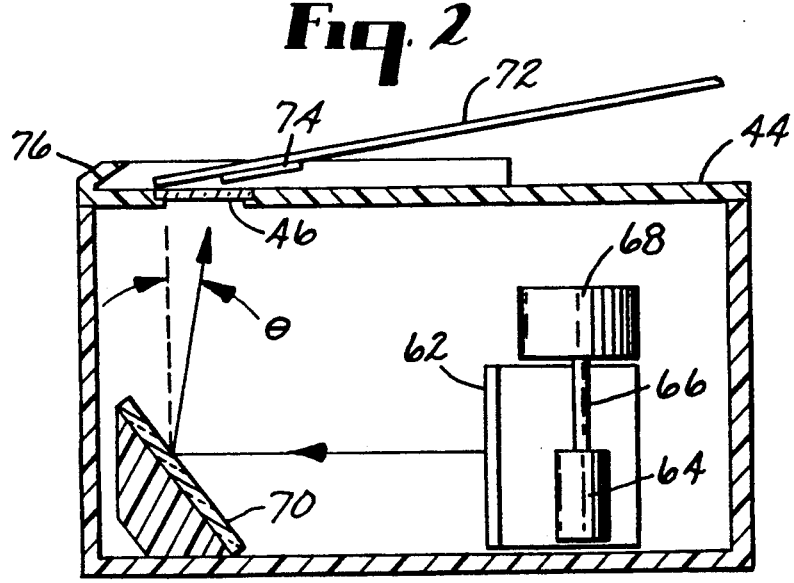
FIG. 5 is a cross-sectional view of the card reader embodiment of the present invention taken along lines 5—5 of FIG. 3, and additionally showing a card as it is inserted into the reader.

With further reference to FIG. 5, it can be seen that elongated mirror 70 is not oriented at a 45° angle with respect to the incoming ray from scanning mirror 62, but rather is slightly tilted from such an orientation (i.e., slightly rotated clockwise as viewed in FIG. 5). More importantly, the reflected beam passes through window 46 at an oblique angle, i.e., the incident angle Θ is greater than 0°. This orientation insures that undesirable specular reflections (whether from the surface of window 46, or from the card resting on cover 44) will not return to lens 60; thus, such reflections are prevented from entering the return optics, and never interfere with the detection mechanism. Retroreflections and some diffuse reflections, however, will be gathered by mirror 70 and lens 60, and will travel backward along the incident optical path all the way to optical assembly block 50. A beam splitter inside block 50 (not shown in FIG. 4 but functioning identically to that shown in FIG. 1) then diverts the return signal to an optical detector (also not visible in FIG. 4). The optical detector and light source 48 are positioned the same distance from the beam splitter, so that the return signal converges (is focussed) at the optical detector, maximizing the signal level.

While the angle of incidence should be greater than zero degrees, it is nevertheless desirable to approach as closely as possible to this in order to maximize the amplitude of diffuse reflections and retroreflections, and maximize the linearity of the scan. Taking into consideration the spreading of the return signal, it can be shown that the minimum angle of incidence Θ necessary to completely avoid specular reflections is given by the equation:

$$\Theta = \arctan\left[\frac{D}{2L}\right]$$

where D is the effective diameter of lens 60, and L is the effective distance from lens 60 to window 46 (i.e., the distance along the optical path). In the preferred embodiment, the lens diameter is about 2.5 cm, and the effective distance between lens 60 and window 46 is about 10.8 cm, yielding an optimum angle of incidence of about 7°. As mentioned below, however, the preferred form of card reader 40 utilizes dual scanning beams, separated at window 46 (the approximate focal plane) by a distance of about 5.6 mm. In order to insure that specular reflections from both beams are not picked up by lens 60, it is necessary use a slightly higher angle of incidence, about 8°.

Other means may be provided, separately or in conjunction with the just described optical geometry, to minimize or eliminate specular reflections from the scanned substrate. For example, if window 46 were a perfect matte surface, no specular reflections would be transmitted therethrough to the detection optics. A thin window constructed of translucent (not transparent) glass would approximate such a matte surface. This characteristic could also be provided by frosting one surface of window 46. If this is done, the outer surface (contacting substrate 72) is preferably frosted; the inner surface may be frosted if window 46 is sufficiently thin. Instead of frosting, the surface could be coated with an optically diffusive material. If the outer surface of window 46 is frosted or coated, the inner surface could also be provided with an anti-reflective coating, which would eliminate specular reflections from the inner surface in addition to the elimination of specular reflections from substrate 72.

Alternatively, means could be provided to shift the frequency of diffuse reflections from the scannable mark, and filter out specular reflections having the same frequency as that of the incident beam. For example, light source 48 could emit ultraviolet (UV) radiation, the scannable mark could be composed of a fluorescent material, and a filter could be provided as shown in FIG. 1 (filter 25) which would block the specular reflections but pass the fluorescent, Lambertian emitted light.

Although card reader 40 may be used to scan other objects besides cards, such as point-of-sale scanning of UPC labelled products, it was primarily designed for use with the Image Access System described in copending U.S. patent application Ser. No. 455,834 filed Dec. 15, 1989, assigned to the assignee of this application. This system utilizes image access cards each of which contain (i) a human readable representation of an electronically stored image, and (ii) machine readable data corresponding to the storage address of the electronically stored image. As noted in a related case, U.S. patent application Ser. No. 544,657 filed Jun, 27, 1990, it may be preferable in some instances to provide the human readable representation on one side of the card for viewing by the user, but provide the machine readable data on the reverse side of the card so that it may be read by a machine without obstructing the view of the human readable representation. This construction of the card is appropriate for use with card reader 40.

FIG. 5 depicts the placement of such a card 72 into reader 40. The card includes a scannable data field 74. In the preferred embodiment, cover 44 of reader 40 includes a rim or flange 76, which has two purposes. First of all, it is preferable to tilt the entire card reader 40 (rotate it about 30° counter-clockwise from the orientation shown in FIG. 5) so that, when card 72 is placed therein, it can be viewed from the side, i.e., without the operator having to stand directly over the unit. Flange 76 therefore serves to support card 72 and keep it from sliding off of cover 44, and to keep scannable data field 74 overlying window 46. Additionally, flange 76 serves to complement the optical geometry of reader 40 with regard to the avoidance of specular reflections.

Specifically, placement of card 72 on reader 40 requires that the bottom edge of card 72 first be placed under flange 76. This means that, as card 72 is inserted and moves flush against cover 44, the incident ray travelling through window 46 never strikes card 72 at a right angle. This feature also relates back to the orientation of elongated mirror 70. If that mirror were tilted counterclockwise from a 45° orientation (rather than the clockwise tilt as depicted), and shifted slightly to the right as seen in FIG. 5, the incident beam would still strike window 46 at an oblique angle, but it is likely that the incident ray passing through window 46 would also strike card 72 at a right angle as the card is inserted, creating specular reflections. Accordingly, the disclosed construction virtually guarantees the avoidance of all specular reflections in reading scannable field 74 of card 72.

Figure 7:
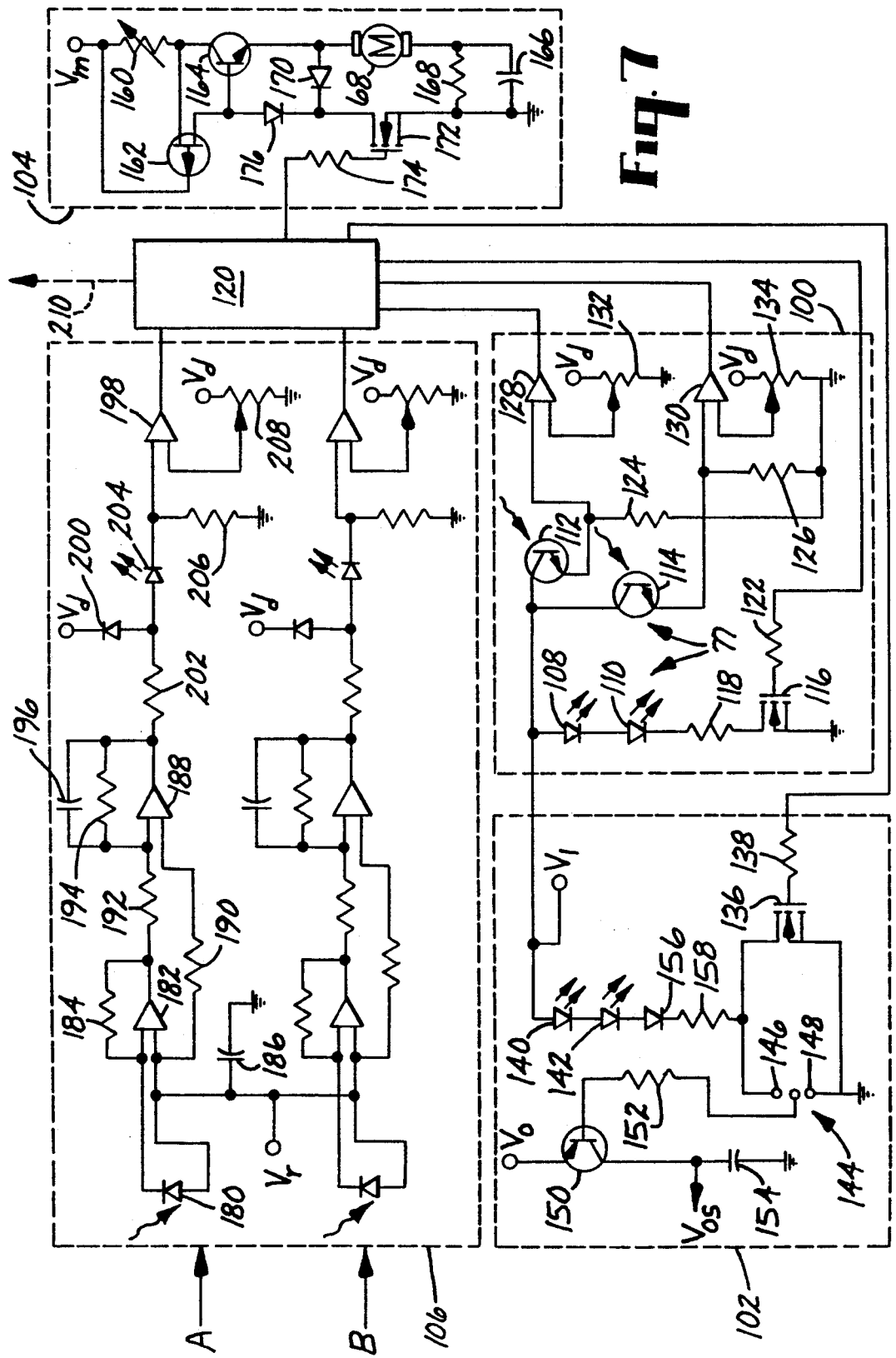
FIG. 7 is a detailed electrical schematic of the electrical systems of the presently preferred embodiment.

Card reader 40 may further include sensors 77 which detect the presence of card 72. These sensors allow reader 40 to be used in an "on demand" manner, rather than requiring continual scanning. This decreases power consumption as well as prolonging the working life of the various components of reader 40. Sensors 77, which are discussed further below in conjunction with FIG. 7, are preferably infrared optical detectors.

The above-described optical readers are useful in reading optical marks based on either retroreflection or diffuse reflection. It is, however, advantageous to use retroreflective markings since such markings are more easily detected, and require a less intense light source. Preferred retroreflective materials are available from 3M's Traffic Control Materials Division, product number 3290, and 3M's Safety and Security Division, product number 8850. The mark may be composed of retroreflective materials on a plain substrate, or black marks placed on a retroreflective substrate (i.e., a retroreflective background). Similarly, while the readers may be used to scan any kind of optical mark (including scannable type face), the preferred embodiment is designed to read bar codes, as suggested in U.S. Ser. No. 544,657 referred to above.

In this regard, a novel bar code scheme may be used to encode data in scannable field 74 of card 72. This scheme may be referred to as an "alternating clock, XOR 2-channel" code, and is illustrated in FIG. 6B. This coding should be compared to FIG. 6A which represents the closest prior art, a 2-channel "fixed clock" scheme. In both figures, representative bar code sequences are shown for 8-digit binary numbers. For purposes of explanation, each of these sequences have been given a digital prefix of "00" and a suffix of "11". The sequences are read from left to right.

Figure 6A:
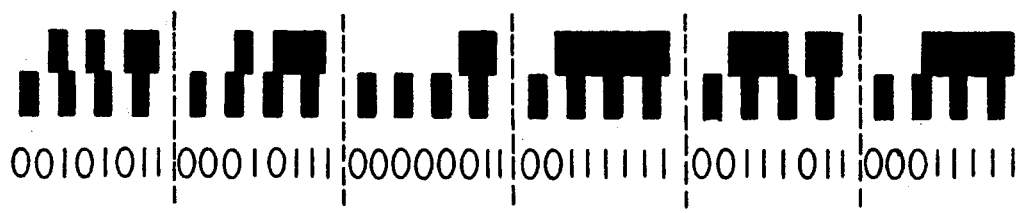
FIG. 6A is a depiction of a prior art bar code scheme.
Figure 6B:
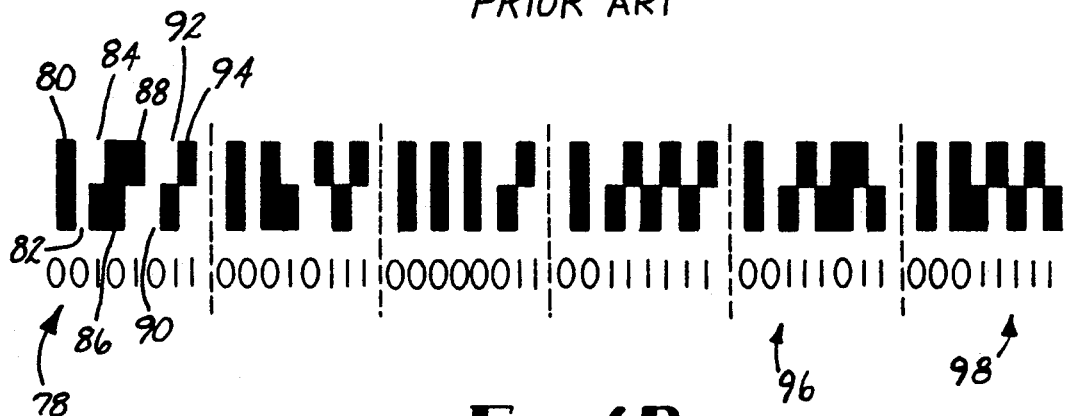
FIG. 6B is a depiction of the novel bar code scheme used in the presently preferred embodiment.

Looking at FIG. 6A, it can be seen that the bottom half of each bar code sequence is identical, i.e., this half provides the reference marks against which the marks in the upper half of the code are compared. The bottom half is referred to as the clock channel, while the top half is referred to as the data channel. The binary digit (bit) is encoded by placing either a white stripe (for zero) or a black stripe (for one) along the data channel at a point corresponding to the edge of the next clock channel stripe. In other words, the clock edge is used to strobe the data into a register.

In the novel code of FIG. 6B, neither channel can be said to clearly be the clock channel, but rather both channels together operate as the clock channel. In other words, a transition on either channel will generate the clock reference signal and begin the data conversion algorithm. The data bit encoded at any given transition is the XOR (logical exclusive OR) of the binary values of both channels.

Take for example the initial bar code sequence 78 in FIG. 6B; assume that a black mark represents a binary value of 1, and a white mark represents a binary value of 0 (these assignments are arbitrary and, as explained further below, could be reversed). The first data bit (the black stripe encoded in data block 80) is zero, since both channels are black (binary value 1) and the XOR operation on these two values yields a zero. The second data bit (the white stripe encoded in data block 82) also represents a zero, since both channels are white (binary value 0) and the XOR operation on these two values also yields a zero. These first two bits denote the previously mentioned prefix "00", and it will be seen that this pattern occurs at the beginning of each bar code sequence in FIG. 6B.

The next (third) data block 84 is black along the lower channel and white along the upper channel. The XOR operation (1 xor 0) is thus 1. The fourth data block 86 in sequence 78 is black in both channels, and so corresponds to a data bit of 0. The fifth data block 88 is black in the upper channel and white in the lower channel, corresponding to a data bit of 1. The sixth data block 90 is totally white, yielding a data bit of 0. Finally, the seventh and eighth data blocks 92 and 94 have different binary values in the upper and lower channels, yielding data bits for these blocks of 1. It will further be noted that each bar code sequence in FIG. 6B terminates in two data blocks having different binary values in the upper and lower channels; these final two data blocks correspond to the "11" suffix.

The reader may detect that a general pattern is now emerging. Any data block in which the color (binary value) is the same in both the upper and lower channels is a "zero," while any data block in which the upper and lower channels differ is a "one". This is true regardless of the actual binary values assigned to the black and white marks, due to the nature of the XOR operator. This also means that the receiver is insensitive to the interchange of the two channels and that, in some circumstances, a given number may be represented in the alternating clock scheme by an inverted bar code, which is not true for prior art bar codes. For example, the data bit of 1 associated with data block 84 in the first sequence 78 is represented by an upper white mark and a lower black mark; this bit could just as easily have been represented by an upper black mark and a lower white mark. This does not mean, however, that equivalent marks can always be interchanged. For example, the data sequence "00" cannot be represented by two successive black stripes, because there would be no cognizable transition between the two data blocks. This requirement also explains why each sequence in FIG. 6B terminates with the "11" suffix, and yet the final two data blocks in sequences 96 and 98 are not identical to the final two data blocks in the other sequences.

Referring now to FIG. 7, a detailed schematic diagram of the electrical system of card reader 40 is shown, as designed for reading a 2-channel bar code such as the previously described 2-channel XOR code. The electrical system may be broken down into four circuits, card sensor circuit 100, power circuit 102, motor control circuit 104, and optical mark detection circuit 106: each of these circuits are indicated by the dashed boxes in FIG. 7.

Card sensor circuit 100 includes the sensors 77 shown in FIG. 4, which are comprised of light-emitting diodes (LED's) 108 and 110, and phototransistors 112 and 114 These components are paired together at either side of card reader 40 under window 46, i.e., LED 108 and phototransistor 112 are positioned adjacent one another at the right edge of window 46, while LED 110 and phototransistor 114 are positioned adjacent one another at the left edge of window 46. In this manner, when a card 72 is placed on cover 44 of reader 40, light from the LED's reflects off card 72 and is sensed by the phototransistors. Preferably, the LED's emit, and the phototransistors detect, infrared radiation.

Although LED's 108 and 110 may be continually supplied with a voltage $v_1$ (typically a 5-volt power source), if reader 40 is powered by a battery then the voltage to the LED's should be pulsed (e.g., about every 10 milliseconds). This may be controlled by a metal-oxide semiconducting field-effect transistor (MOSFET) 116 which connects the LED's to ground via a current limiting resistor 118. The gate of MOSFET 116 is connected to a controller 120 which, in the preferred embodiment, is a microprocessor such as that sold under part number D83C51FA by Intel Corporation of Santa Clara, California, which includes a masked read-only memory (ROM), random-access memory (RAM) and a universal asynchronous receiver-transmitter (UART). A resistor 122 protects MOSFET 116 from electrostatic discharge, and further protects microprocessor 120 against catastrophic failure of MOSFET 116. Other switching means, such as a simple transistor, may be substituted for MOSFET 116.

The outputs of phototransistors 112 and 114, which are loaded by resistors 124 and 126, are directed to comparators 128 and 130, respectively. Two potentiometers 132 and 134 set the reference voltage for comparators 128 and 130, the reference voltage being derived from $v_d$ (for digital voltage) which, in the preferred embodiment, is 5 volts (i.e., $V_d=V_1$). The comparator outputs are then directed to microprocessor 120. Thus, when card 72 is placed in the proper position on cover 44, the output of both comparators 128 and 130 are switched to an active state.

The ROM in microprocessor 120 includes program instructions which respond to this state by sending appropriate control signals to power circuit 102 and motor control circuit 104. Power circuit 102 is controlled via another MOSFET 136. Resistor 138 protects MOSFET 136 from electrostatic discharge, and further protects microprocessor 120 from catastrophic failure of MOSFET 136. MOSFET 136 serves as a switch to limit power consumption by (i) the operational amplifiers ("op amps") used in detection circuit 106, and (ii) the LED's 140 and 142 used as light source 48. In this regard, FIG. 7 includes a jumper 144 having two terminals 146 and 148. If the unit is designed to run off an external power source, then power consumption is not critical and the jumper may be connected to terminal 148, bypassing the op amp switching effect of MOSFET 136. If, however, card reader 40 is designed to run off battery power, then jumper 144 should be connected to terminal 146, in which case power to the op amps and LED's 140 and 142 will be controlled by MOSFET 136. Other switching means, such as a transistor, may be used in place of MOSFET 136.

The power for the op amps is indirectly supplied by a voltage source $V_o$ which is controlled by a transistor 150. When jumper 144 is connected to terminal 146, transistor 150 is affected by MOSFET 136 via current limiting resistor 152. In the preferred embodiment, $V_o$ is a 30 volt source, and is the same source that powers motor 68. Therefore, a capacitor 154 is preferably used to filter out any low frequency noise from the op amp power supply $V_o$. Although not shown, each op amp package includes a decoupling capacitor across its power supply ($V_{os}$) to remove parasitic oscillations.

Power to LED's 140 and 142 are supplied by the Same source as for LED's 108 and 110, viz., $V_l$. When MOSFET 136 is conducting, current flows through LED's 140 and 142 to ground, With an intervening diode 156 and a current limiting resistor 158. Diode 156 is used to prevent the voltage differential between $V_o$ and $V_l$ from turning on transistor 150, and also serves to block LED's 140 and 142 (which exhibit a high reverse voltage leakage current) from receiving excessive reverse voltage.

In the preferred embodiment, LED's 140 and 142 are high intensity and have a beam divergence of about an 8° cone angle. The specific components used are Gallium-Aluminum-Arsenide LED's sold by Hewlett-Packard of Palo Alto, California, under part number HLMP4101. Several other types of LED's may be used, although they should preferably be high-intensity and have a beam divergence which complements the optical geometry of card reader 40. For example, the LED's used in practice emit a visible red beam, but infrared LED's might be used, in which case window 46 could appear black, although it would pass IR radiation. Other types of light sources may be used, including lasers or laser diodes. These components are, however, more expensive and consume more power. As noted above, if the scannable field 74 on card 72 includes retroreflective marks, then a high intensity LED provides more than sufficient incident radiation to create a detectable retroflection. Contrast ratios as high as 80:1 have been achieved using this construction.

When microprocessor 120 sends the control signal to Power circuit 102, it contemporaneously sends a control signal to motor control circuit 104. Motor control circuit 104 includes motor 68 which, in the preferred embodiment, is a permanent magnet direct-current motor, and is powered by voltage source $V_m$ (preferably about 30 volts). The current from this source is regulated by variable resistor 160, junction field-effect transistor (JFET) 162, and transistor 164 which together provide a constant current source.

Prior to receiving the control signal which activates circuit 104, current from the emitter of transistor 164 drives motor 68 to a home position, i.e., biased so that incident radiation striking scanning mirror 62 will first be directed toward one end, but not the center, of elongated mirror 72. Pads or stops (not shown) are provided adjacent scanning mirror 62 to limit extreme movement thereof. As motor 68 is driven to this home position, a large (e.g., 100 microfarad) capacitor 166 is charged. A bleed resistor 168 insures that the motor, and thus scanning mirror 62, maintains its bias in the home position. A diode 170 prevents current from JFET 162 from being shunted through motor 68 during the charging of capacitor 166.

When a card is detected by sensor circuit 100, microprocessor 120 sends a control signal to another MOSFET 172 (via protective resistor 174), which allows capacitor 166 to discharge to ground through motor 68. During this discharge cycle, another diode 176 shunts the current which normally flows from JFET 162 to transistor 164. Diode 170 also provides a biasing voltage drop which turns off transistor 164. Although other switching means (such as a transistor) may be substituted for MOSFET 172, it is desirable to use a component which allows high current flow with a low voltage drop across MOSFET 172 (e.g., <0.2 volts). The MOSFET sold by Motorola Corp. of Schaumburg, Illinois, under part number MPF9200 is suitable for this purpose.

Capacitor 166 discharges in about 4 milliseconds, but this creates sufficient momentum in motor 68 to provide a smooth rotation of scanning mirror 62. In the described embodiment, it takes about 40 ms to complete the scan across window 46. Shortly after this delay, microprocessor 120 cuts off the control signal to motor control circuit 104, which allows motor 68 to return to its home position and capacitor 166 to re-energize. Power circuit 102 is turned off during this delay. One advantage in the construction of motor control circuit 104 is the fact that there is minimal current from voltage source $V_m$ during the half-cycle of scanning since motor 68 is not directly powered by $V_m$. Instead, the power for energizing motor 68 during the scan is stored in capacitor 166 which is charged before scanning takes place. This eliminates the introduction of noise into the electrical system (for both light source 48 and detection circuit 106) which could result in an erroneous reading.

In accordance with the foregoing, when sensor circuit 100 detects the presence of card 72, LED's 140 and 142 are powered, power flows to the op amps in detection circuit 106, and motor 68 begins to scan. It will therefore be appreciated that the combination of card sensor circuit 100, power circuit 102, and motor control circuit 104 provide an "on demand" system. In other words, card reader 40 is not continually scanning (which would drain a battery power source and cause excessive wear on the mechanical and electrical components), but rather only scans when a card 72 is placed on cover 44.

Optical mark detection circuit 106 is now explained. That circuit includes two channels A and B which are essentially identical, so only one set of reference numerals is used to describe the components therein. Each channel includes a photodiode 180 which responds to the reflections from scannable data field 74. The two photodiodes are placed adjacent one another in card reader 40 at the same spacing that exists between the light source LED's 140 and 142, so that they respond, respectively, to the separate channels in the 2-channel XOR bar code. Photodiodes available from EG&G Vactec, Inc., of St. Louis, Missouri, under part number VTB9413, may be used.

The photodiodes are connected to op amps 182 and feedback resistors 184, and operate in a zero bias mode. A reference voltage $V_r$ is provided to bias op amps 182 away from the negative rail voltage, and a filter capacitor 186 eliminates high frequency noise from $V_r$. In the preferred embodiment, $V_r$ is the same as $V_1$ and $V_d$ (5 volts). The outputs of op amps 182 are connected to the negative inputs of op amps 188, while their positive inputs are connected to current biasing resistors 190. It is understood that the voltage $V_{os}$ output by power circuit 102 provides power to op amps 182, as well as op amps 188.

Each of the op amps 182 and 188 are used to amplify the signal from photodiodes 180, and each op amp has a gain of about 100. Resistors 192 and 194 are used to adjust the gain of op amps 188. In the preferred embodiment, the op amps are those sold by National Semiconductor Corp. of Santa Clara, California, under part number LF412. Capacitors 196 act as bandwidth limiters to eliminate parasitic oscillations between op amps.

The outputs of op amps 188 are connected to comparators 198. Although not shown, it is understood that comparators 198 are provided with a power source, such as 5 volts. Voltage source $V_d$ provides the bias voltage for the clipping diodes 200 that protect the comparators from excessive voltages emanating from the op amps. Current limiting resistors 202 protect clipping diodes 200. Another set of LED's 204 are used to drop the bias voltage; this places the signal within the operating range of comparators 198. Other means could be provided in place of LED's 204 to achieve this voltage drop, such as a stack of pin diodes. Resistors 206 are used to bias LED's 204. Potentiometers 208 set the reference voltage for comparators 198, the reference voltage again being derived from $V_d$. The outputs of the comparators, which are essentially binary signals corresponding to the optical marks on card 72, are directed to microprocessor 120.

Microprocessor 120 may be programmed to perform the data analysis of the output of detection circuit 106, e.g., the XOR operation as described above. The resulting data sequence may further be manipulated within microprocessor 120, or may be directed to another central processing unit (CPU) as indicated at 210 by the UART. For example, in the previously mentioned Image Access System, the data encoded on the image access card corresponds to the storage address of an electronically stored image. The data may be the actual storage address or an assigned number which can be associated with the storage address through a reference table. In such a system, microprocessor 120 would output the access data to a CPU which would then determine the storage address of the image, retrieve the image information and forward it to a display device.

As mentioned in the related U.S. application Ser. No. 455,834, the CPU (or, e.g., microprocessor 120) may be programmed to recognize a valid data sequence. If the initial scan by reader 40 results in such a valid sequence, then microprocessor 120 cuts off the control signal to power circuit 102. If, on the other hand, an invalid sequence is recorded, then the control signal to power circuit 102 switches back on, and a second control signal is sent to motor control circuit 104, resulting in another scan. This may be repeated indefinitely until a valid sequence is obtained; however, it is deemed preferable to limit such repetitions to three scans after which, if the data still appears to be invalid, an annunciator (not shown) on reader 40 may be illuminated to alert the user to a potential problem, e.g., a marred bar code on card 72, or improper placement of the card on cover 44.

In this regard, microprocessor 120 is programmed to recognize when the card is removed from reader 40, i.e., when the states of comparators 128 and 130 change from their high setting. In this manner, when one card is removed from reader 40 and another placed thereon, the foregoing process will be repeated to capture the data sequence of the next card.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, mirror 62 could be stationary if means were provided to move card 72 across cover 44 in a sliding manner; the optical geometry would still insure that specular reflections are not received by the detection equipment. Also, card reader 10 could easily be modified to scan for other types of optical marks besides the 2-channel XOR code, including single channel bar codes or optically scannable typeface. It is therefore contemplated that the appended claims will cover such modifications that fall within the true scope of the invention.

I claim:

1. An apparatus for optically scanning an object having an optically readable mark, comprising:
   a housing;
   light means located in said housing for providing a beam of light;
   a scanning mirror disposed along a path of said light beam, in said housing;
   optical detection means located in said housing;
   motor means for moving said scanning mirror;
   means, connected to said motor means, for storing electrical energy;
   power means for supplying energy to said light source and said optical detection means; and
   motor control means, connected to said power means, for temporarily disconnecting said power means from said motor means, wherein energy flows to said motor means from said energy storing means only.

2. The apparatus of claim 1 wherein said energy storing means comprises a capacitor connected to a contact of said motor means.

3. The apparatus of claim 1 wherein said motor means includes a permanent-magnet, direct-current motor.

4. The apparatus of claim 1 further comprising optical collection means for directing reflections from the object to said optical detection means.

5. The apparatus of claim 4 wherein said optical collection means minimizes reception, by said detection means, of specular reflections from the object, but allows said detection means to receive non-specular reflections from the object.

6. The apparatus of claim 4 wherein said optical collection means includes a retrocollection system.

7. The apparatus of claim 1 wherein said housing includes a generally planar stage having a window, and said scanning mirror is located so as to reflect said light beam toward said window.

8. The apparatus of claim 7 wherein said scanning mirror is oriented so as to reflect said light beam toward said window at an oblique angle.

9. The apparatus of claim 7 adapted to scan an object which comprises a generally planar substrate, and wherein said housing further includes flange means mounted on the outside of said housing, proximate said window, for abutting the substrate, and oriented with respect to said scanning mirror whereby the substrate is maintained at an oblique angle with respect to said light beam as it is placed on said stage.

10. The apparatus of claim 7 further comprising:
    sensor means for detecting the presence of the object near said stage;
    power control means responsive to said sensor means for regulating said power means; and
    processor means for controlling said power control means and said motor control means, said processor means being responsive to said sensor means.

11. The apparatus of claim 10 wherein said processor means is connected to said optical detection means and includes means for decoding output of said detection means.

12. An apparatus for optically scanning an object having optically readable indicia, comprising:
    a housing;
    light means located in said housing for providing a beam of light;
    a scanning mirror disposed along a path of said light beam, in said housing;
    optical detection means located in said housing;
    power means for supplying energy to said light source and said optical detection means;
    a direct-current motor attached to said scanning mirror, having first and second electrical contacts;
    means for storing electrical energy, said energy storing means having first and second electrical contacts, said first contact of said energy storing means being connected to said first contact of said motor, and said second contact of said energy storing means being connected to ground; and
    motor control means, connected to said power means, for switchably connecting said second contact of said motor either to said second contact of said energy storing means or to said power means.

13. The apparatus of claim 12 wherein said power means includes a constant current source connected to said motor control means wherein, when said control means is switched to connect said second contact of said motor to said constant current source, current flows through said motor, driving said scanning mirror to a home position while charging said energy storing means.

14. The apparatus of claim 12 further comprising a bleed resistor connected in parallel with said first and second contacts of said energy storing means.

15. The apparatus of claim 12 wherein said energy storing means comprises a capacitor.

* * * * *